L. C. GLOVER.
ATTACHMENT FOR RAKES.
APPLICATION FILED SEPT. 3, 1913.

1,112,787.

Patented Oct. 6, 1914.

WITNESSES
F. E. Gaither
Lois Wineman

INVENTOR
Lewis C. Glover
by W. T. Doolittle
attorney

UNITED STATES PATENT OFFICE.

LEWIS C. GLOVER, OF KNOXVILLE, PENNSYLVANIA.

ATTACHMENT FOR RAKES.

1,112,787.  Specification of Letters Patent.  Patented Oct. 6, 1914.

Application filed September 3, 1913. Serial No. 787,829.

*To all whom it may concern:*

Be it known that I, LEWIS C. GLOVER, a citizen of the United States, residing at Knoxville, in the county of Allegheny and State of Pennsylvania, have invented certain new and useful Improvements in Attachments for Rakes, of which the following is a specification.

The prime object of my invention is to provide new and improved means for cleaning or freeing the teeth of a rake from grass, leaves, and other matter accumulated on and between the teeth of a rake.

Figure 1:
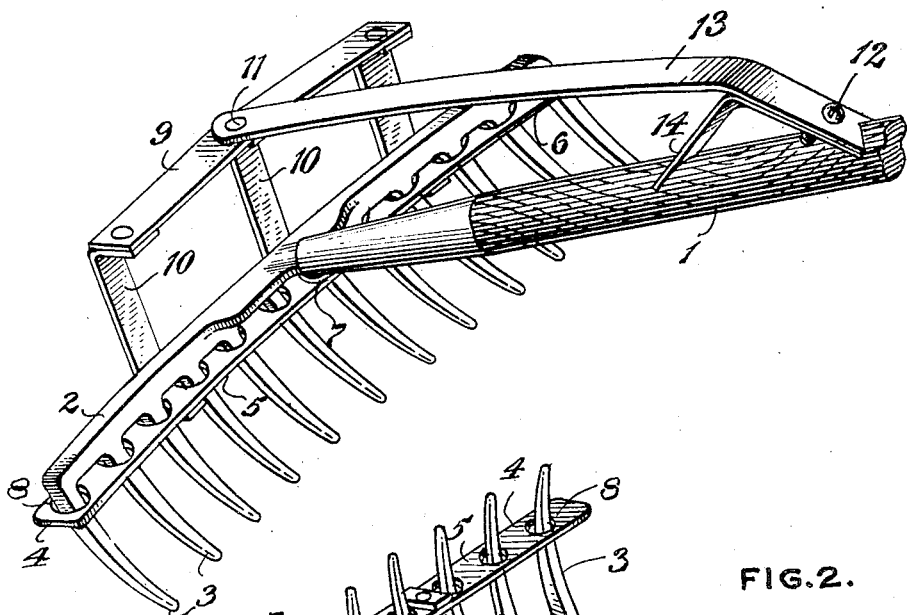
Figure 2:
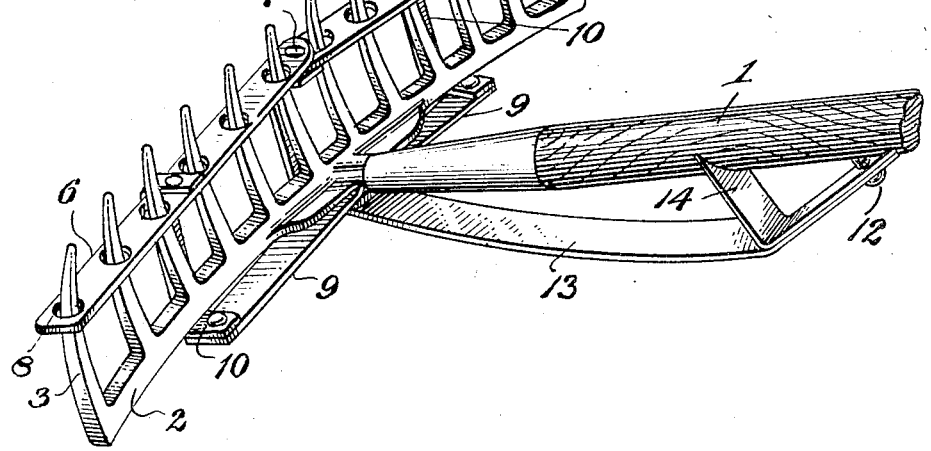

In the accompanying drawing, which illustrates an application of my invention, Figure 1 is a perspective view of a rake showing my attachment applied thereto; and Fig. 2 a similar view showing the rake inverted and the rake cleaner depressed.

Referring to the drawing, 1 designates a handle, 2 the cross rod or member, and 3 the teeth of a rake of the usual and well known construction.

My invention is designed to be applied to a hand rake of the usual construction, and as illustrated, comprises an apertured jointed tooth clearer rod or bar 4, consisting of two members 5 and 6 pivotally joined as indicated at 7. The teeth of the rake are designed to be inserted through the apertures 8 of the apertured bar, and said bar is slidable upon the teeth. 9 designates a cross rod or member normally disposed in a horizontal plane a distance above the cross member of the rake, said rod 9 being connected with the apertured bar 4 by means of vertically extending rods 10. Having one end connected with the cross member 9 as shown at 11, and its other end connected with the handle of the rake by means of a screw 12, I provide a spring plate member 13. Located near the end of the spring plate member which is secured to the handle of the rake is a bridge-piece 14. This bridge-piece 14 may be formed integral with spring member 13 or separate therefrom, as desired.

The rake proper is designed to be used in the usual manner, and when grass, leaves, etc., are caught by the teeth of the rake said accumulated matter may be readily freed from the teeth by depressing the apertured bar 4 by exerting pressure on the spring member 13, thereby depressing the apertured bar 4, and freeing the rake of accumulated matter.

By making the apertured bar 4 in two parts and pivotally joining the inner ends thereof, the rake attachment may be collapsed into a convenient form for shipping purposes.

The attachment for clearing the rake teeth may be sold separately from the rake, so by pivoting the bar members 9 on the intermediate bar member 10 and pivoting the bar members 5 and 6 to the intermediate bar member 10 at 7 and in alinement with the pivot 11 for the members 9, the outer ends of one member 9 and the member 5 may be swung inwardly toward the spring member 13. The outer end of the other member 9 and the outer end of the bar member 6 may be swung inwardly toward the spring member 13. This will permit the collapsed device to be packaged within a small compass, and facilitate the storing of the same. Another advantage of the invention is that the pivoting of the bars to the intermediate member 10 permits lateral play of the clearer bar with respect to the teeth of the rake, and this is an advantage in the event that any of the teeth become bent, as they sometimes do in practice, for the pivotal connection permits the clearer bar to have sufficient play to prevent binding on the teeth.

What I claim is:

1. A rake tooth clearer comprising a spring bar for attachment to a rake handle, and a tooth clearer bar consisting of two parts pivotally supported at their inner ends by the spring bar and mounted to permit their outer ends to swing toward the spring bar when the clearer is applied.

2. A rake tooth clearer comprising a bar having means at one end for attachment to a rake handle, and tooth clearer members swingingly connected to the other end of the bar, the free ends of said members having movement toward and away from the longitudinal center of said bar.

3. A tooth clearer for rakes comprising a jointed spring-actuated tooth clearer bar, a spring member for connection with a rake handle, a jointed cross bar, and uprights connecting the cross bar and the clearer bar.

4. A jointed tooth clearer bar, a jointed supporting bar, the joints in both bars being in alinement, means connecting said bars, and means on one of said bars for attachment to the handle of a rake.

5. The combination with a rake head having teeth and a handle connected to said head, of a spring bar connected to the handle, a jointed and pivotally connected apertured tooth clearing bar through which the teeth of the rake project, and a connection between the spring bar and the tooth clearer bar to permit lateral movement of the tooth clearer bar with respect to the teeth.

In testimony whereof I affix my signature in presence of two witnesses.

LEWIS C. GLOVER. [L. S.]

Witnesses:
J. HERBERT BRADLEY,
F. E. GAITHER.